(12) United States Patent
Scalart et al.

(10) Patent No.: US 7,023,986 B2
(45) Date of Patent: Apr. 4, 2006

(54) ECHO CANCELLER IN A COMMUNICATION SYSTEM AT A TERMINAL

(75) Inventors: Pascal Scalart, Trebeurden (FR); Grégoire Le Tourneur, Saint Quay Perros (FR); Franck Bouteille, Munich (DE); Christophe Beaugeant, Trebeurden (FR)

(73) Assignee: France Telecom, SA, Paris (FR)

( * ) Notice: Subject to any disclaimer, the term of this patent is extended or adjusted under 35 U.S.C. 154(b) by 246 days.

(21) Appl. No.: 10/149,027

(22) PCT Filed: Dec. 8, 2000

(86) PCT No.: PCT/FR00/03450

§ 371 (c)(1),
(2), (4) Date: Oct. 25, 2002

(87) PCT Pub. No.: WO01/43413

PCT Pub. Date: Jun. 14, 2001

(65) Prior Publication Data

US 2003/0099349 A1 May 29, 2003

(30) Foreign Application Priority Data

Dec. 9, 1999 (FR) .......................................... 99 15643

(51) Int. Cl.
*H04M 1/00* (2006.01)

(52) U.S. Cl. ............................ 379/406.05; 379/406.06; 379/406.08

(58) Field of Classification Search ............ 379/406.01, 379/406.04, 406.06, 406.08, 406.02, 406.05, 379/406.07, 406.14

See application file for complete search history.

(56) References Cited

U.S. PATENT DOCUMENTS 5,561,668 A 10/1996 Genter
5,933,495 A * 8/1999 Oh ........................ 379/406.08

FOREIGN PATENT DOCUMENTS

EP          0 789 476 A3    8/1997
WO          01/43413        6/2001

* cited by examiner

*Primary Examiner*—Jefferey Harold
(74) *Attorney, Agent, or Firm*—Lowe, Hauptman & Berner, LLP

(57) ABSTRACT

A terminal in a communication system includes emitting and receiving transducers and an echo processor having an adaptive echo canceler that processes a residual echo output from the adaptive echo canceler.

19 Claims, 1 Drawing Sheet

ECHO CANCELLER IN A COMMUNICATION SYSTEM AT A TERMINAL

Figure 1:
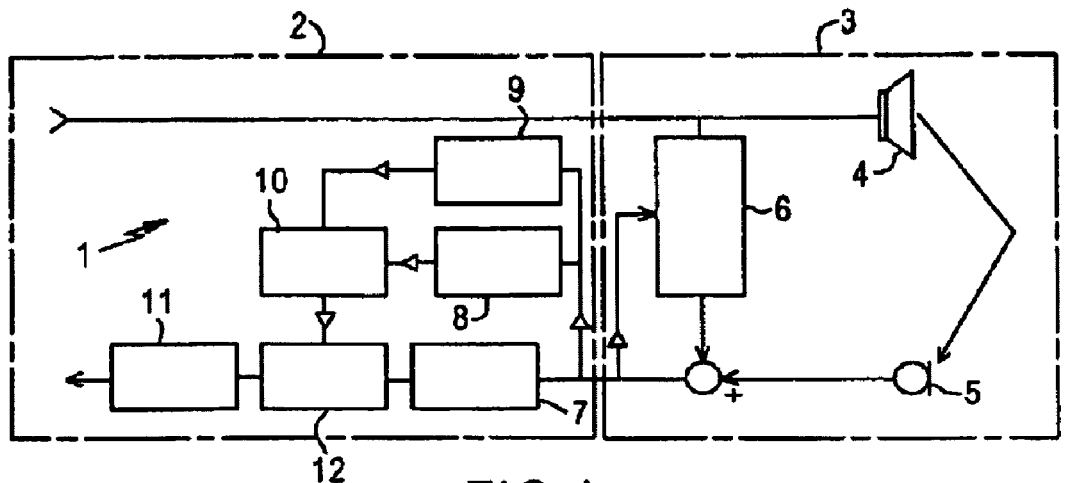

The present invention concerns in general terms a device for processing the echo in a communication system. More particularly, it concerns a system for processing the echo at a terminal comprising a first transducer receiving a signal comprising a part due to the activity of a distant user and a second transducer emitting a signal comprising a useful part due to the activity of a local user. Generally, the activities of the users in question are voice activities, the said first transducer being a loudspeaker and the said second transducer being a microphone. It is often a case of allowing a comfortable "hands-free" telephone conversation, that is to say one enabling a user to move freely in a room without having to be burdened with a handset or other device.

One of the major problems posed by this type of "hands-free" telephone conversation relates to the phenomenon of echo which results from the fact that the microphone and loudspeaker are not completely acoustically decoupled. In other words, the sound emitted by the loudspeaker is reflected on the walls of the room, on furniture, or even on people moving in the room, and is thus picked up by the microphone.

This problem is conventionally resolved by using an adaptive echo cancellation device adapted to calculate, from the signal received by the loudspeaker, an estimation of an echo part of the signal emitted by the microphone and to correct the latter accordingly.

Such an adaptive echo cancellation device uses a modelling of the pulse-type response of the system consisting of the loudspeaker, the room where the "hands-free" conversation is taking place and the microphone. Conventionally, this modelling is done by adjusting the coefficients of a finite pulse response filter having a certain number L of coefficients.

After an initial convergence period, the coefficients of the adaptive filter generally converge towards those of the Wiener filter with L coefficients minimising the mean value of the power of the filtering error.

Devices of this type are those, for example, to which reference is made in Chapter 4.2 ("Sub-band Acoustic Echo Canceller" of the article "*Achieving the control of the acoustic echo in audio terminals*" by A. Gilloire and J. F. Zurcher, which appeared in 1988 in Signal Processing IV—Theories and Applications, on pages 491 to 494, or in Chapter 5 ("Adaptive Echo Compensation") of the article "*The hands-free telephone problem—An annotated bibliography*" by Eberhard Hänsler, which appeared in 1992 in Signal Processing, on pages 259 to 271.

However, as is indicated in the latter document, the number of coefficients required to effect the modelling is very high and consequently the computing capacity required to use such a device is extremely heavy.

However, given the economic constraints imposed for the marketing of such a device, the number of coefficients of the filter must be limited to a value compatible with the processing and memory capacities of the target digital signal processor (DSP). This number is generally less than the number of coefficients required for achieving effective cancellation of the echo.

Consequently, a sometimes audible residual echo will remain in the majority of applications.

The subject matter of the present invention is therefore in particular a processing for eliminating or at least attenuating the said residual echo so that it is no longer audible.

It has already been proposed to provide, at the input and output of the terminal, a device for processing the residual echo based on the variation in the reception and transmission gains.

The general principle of the processing of the echo based on the variation of the reception and transmission gains is well-known. It is described, for example, in Chapter 4.1 ("Efficient Gain Variation Scheme") in the article "*Achieving the control of the acoustic echo in audio terminals*", mentioned above. It is a case first of all of attenuating the signal emitted during a period of voice activity of the distant user and the voice inactivity of the local user. The transmission gain is therefore reduced when such a situation is detected. Thus the residual echo liable to be transmitted in return is attenuated until it disappears. Moreover, when a period of voice activity of the local user is detected, more precisely at the moment when the latter begins to speak, the transmission gain is allowed to return to 1 and the reception gain is reduced in order to minimise the acoustic coupling between the transducers. In the case of dual speech that is to say when the two users are speaking at the same time, priority will be given to the direction of transmission for which the signal has the highest energy level.

This known type of device for processing residual echo based on the variation in reception and transmission gains poses a certain number of problems.

When the coupling between transducers is high, this device can result in a quasi-alternating conversation. The starts and ends of voice sequences are often truncated. All this takes place to the detriment of the intelligibility and interactivity of the conversation.

Likewise, when it is difficult to have a priori knowledge of the characteristics of the acoustic coupling between transducers, for example in the case of a room where many people are moving about, it is very difficult to obtain a sufficiently precise and rapid adjustment of the parameters participating in the calculation of the transmission and reception gains and consequently to allow a true simultaneous conversation.

When there is a high level of background noise, in particular when this background noise has characteristics of voice activity, the conversation may take place in only one direction to the detriment of the distant user.

Other significant problems result from the presence of a background noise in the acoustic environment of the local user. This is because the conventional residual echo processing device based on variation in transmission and reception gains then causes effects such as noise contrasts, speech chopping phenomena or noise pumping effects.

It has been proposed, in order to resolve this last type of problem, to transmit to the distant user a synthetic comfort noise at the moments when the residual echo signal is present on the transmission channel. Such a solution is described for example in the article "*A network speech echo canceller with comfort noise*" by D. J. Jones, S. D. Watson, K. G. Evans, B. M. G. Gheetham and R. A. Reeves, which appeared in 1997 in the context of EUROSPEECH '97, which was held on Rhodes in Greece. The technique used for the processing of the residual echo consists of replacing the low levels of the microphone signal with a synthetic comfort noise, the high levels being transmitted without modification by the processing. It entails the calculation of a cutoff threshold which must be sufficiently great not to create noise contrast during the moments of voice non-activity, and sufficiently low not to introduce distortions on the local voice activity. This compromise can be found only for a given use configuration, that is to say for a given coupling, noise level and user/microphone distance.

In the patent document EP-A-789 476, a system is described which is provided on the one hand with echo cancellation means and on the other hand background noise reduction means, each functioning in the frequency domain. In particular, the elimination of the noise implemented by the noise suppression means consists of estimating the power spectrum of each sub-band, estimating the noise spectrum and deducing therefrom the gain to be applied to the sub-band signal so that the noise is reduced. If the gain thus calculated is less than a minimum constant gain, the gain applied to the signal is then this minimum gain.

The system described in the patent document EP-A-789 476 also includes residual echo elimination means, these means being active only in the periods where the local user is himself active. It consists of determining the echo elimination energy ratio and comparing this ratio with a constant. If this ratio is less than this constant, then no action is taken. On the other hand, if such is not the case, then a method of reconformation of the spectrum using the noise spectrum analysed for each band is implemented.

The system therefore performs a processing in which only the transmission gain is modulated. This promotes the interactivity and intelligibility of the conversation, the signal received by the first transducer, that is to say the loudspeaker in the case of a "hands-free" device, not being able to be truncated.

Such a procedure for eliminating residual echo noise does however have the drawback of resulting in attenuations of the noise which may be inordinate, giving rise to audible artefacts.

The present invention relates to a processing of the residual echo which does not have such drawbacks. More particularly, it relates to a processing of the residual echo which introduces no perceptible effect on the noise, including under unfavourable conditions of use, for example a high noise level, a variable noise, a noise exhibiting voice activity characteristics, a large number of persons in a room, a reverberating room, etc. This processing must also be as independent as possible of the characteristics of the acoustic coupling between the transducers and be adapted to long or short pulse responses.

To this end, an echo processing device according to the invention is of the type which comprises a first transducer receiving a signal comprising a part due to the activity of a distant user and a second transducer emitting a signal comprising a useful part due to the activity of a local user, a background noise part and an echo part due to coupling between the said transducers, the said echo processing device comprising an adaptive echo cancellation device adapted to calculate, from the signal received by the said first transducer, an estimation of the said echo part of the signal emitted by the said second transducer and subtracting the said estimation of the said signal emitted by the said second transducer in order to produce an output signal from the echo cancellation device. It is also of the type which comprises a device for processing the residual echo at the output of the said adaptive echo cancellation device, the said residual echo processing device comprising a gain control means modifying the said output signal of the echo cancellation device, the said gain control means comprising a first analysis means for distinguishing components which make up the said echo part, a second analysis means for identifying components which constitute the said background part, and a calculation means for determining a gain variation law, so as to reduce to the maximum possible extent the levels of the said components making up the said echo part without substantially affecting the said useful parts.

According to an essential feature of the present invention, the said device has a compensation means for compensating for the effects of the said gain variation law on the said components making up the said background noise part, the said compensation means comparing the level of the output signal as it should be after application of the said gain variation law at the level of a corresponding component making up the said background noise part determined by the said second analysis means and, if it determines that the said level of the said output signal is less than the said level of the said component, modifies the gain determined by the said variation law so that the output signal modified by the said gain control means is at the level of the said component making up the said background noise part.

According to the invention, a gain variation law is therefore initially calculated and, even before applying the gain resulting from this calculation, a compensation is effected. The initial gain variation law is calculated, in a conventional manner, from the energies of the signals of the transducers, the estimated echo signal, the residual signal output from the echo cancellation device, and the background noise identified. Many known initial gain calculation procedures can be used. For example, the procedure described in the patent document FR-A-2 748 184 can be used.

The role of the compensation means is in particular to avoid the background noise signal undergoing audible modifications because of the processing of the residual echo. In addition, the properties of the human psycho-acoustic apparatus are used, which means that the ambient noise signal subjectively masks the residual echo signal.

Advantageously, the compensation means compares the mean energy of the output signal as it should be after application of the said gain variation law to the mean energy of the background noise part evaluated during moments when the signal exchanged in the said communication signal have no useful part and, if it determines that the said mean energy of the said signal is less than the said mean energy of the background noise part, modifies the gain determined by the said variation law so that the output signal modified by the said gain control means is at the level of the said background noise.

Advantageously, the mean energy of the background noise part is corrected by a coefficient for controlling the residual noise level which will be transmitted.

According to another aspect of the present invention, the compensation means comprises a means for generating a simulation signal reproducing the characteristics of the said background noise part, the said means being activated when the said output signal is modified by the said gain control means.

Here, the gain calculated by the initial gain variation law is kept as it is, but a simulation signal whose spectral characteristics are as close as possible to those of the actual noise is generated and added to the output signal. This allows a great magnitude of variation in gain free of the noise contrast problems.

Advantageously, the simulation signal, weighted by a factor, is added to the said output signal modified by the gain determined by the said variation law, the sum of the said weighting factor and of the said gain being equal to 1.

Advantageously, there is provided a means of detecting activity of the users in order to adjust the said simulation signal generation means when the users are inactive. It will generally be a case of a voice activity detector (VAD).

According to another aspect of the present invention, a first transformation means for passing from a time processing domain to a spectral processing domain and a second transformation means for passing to the spectral processing domain again are provided on each side of the said gain control means, the said components making up the echo part or making up the background noise part then taking the form of spectral components of the said output signal.

Thus the processing is carried out in a transformed domain which generally corresponds to Fourier harmonic analysis.

Advantageously, in the spectral domain, the spectral components of the output signal are analysed sequentially by frequency band samples, the said first analysis means distinguishing each component making up the said echo part, the said second analysis means identifying a spectral component making up the said background noise part, the said calculation means determining a gain peculiar to a given spectral component, so as to reduce its level to the maximum possible extent if it makes up the said echo part, and the compensation means comparing the energy of the output signal as it should be after modification by the said gain, for the said given spectral component, with the energy of the corresponding spectral component constituting the said background noise part and, if it determines that the said energy of the output signal is less than the said energy of the said spectral component, modifying the said gain so that the said given spectral component is at the level of the said corresponding background noise spectral component.

This processing in the spectral domain exploits here too the psycho-acoustic properties of the human auditory apparatus, that is to say simultaneous masking and frequency masking. In simultaneous voice activity situations, the spectral components which correspond to the activity of the local user are not attenuated, or only a little. The residual echo signal is subjectively masked because of the psychoacoustic simultaneous masking property. As for the spectral components which correspond to the echo alone, these are attenuated until they are returned to the level of the ambient noise. The modification made will not interfere because of the frequency masking, that is to say the masking of a sound by another sound with a different frequency, by the useful part of the signal.

According to another aspect of the present invention, there is proposed a method of processing the echo in a communication system at a terminal comprising a first transducer receiving a signal comprising a part due to the activity of a distant user and a second transducer emitting a signal comprising a useful part due to the activity of a local user, a background noise part and an echo part due to coupling between the said transducers, the said method comprising a first adaptive echo cancellation step consisting of calculating, from the signal received by the said first transducer, an estimation of the said echo part of the signal emitted by the said second transducer and subtracting the said estimation of the said signal emitted by the said second transducer in order to produce an output signal. The said echo processing method is characterised in that it comprises a second step of processing the echo remaining after the said echo cancellation step, the said second step consisting of distinguishing elements which make up the said echo part, identifying elements which make up the said background noise part, determining a gain variation law modifying the said output signal so as to reduce to the maximum possible extent the levels of the said components making up the said echo part without substantially affecting the said useful part, and compensating for the effects of the said gain variation law on the said components making up the said background noise part.

This processing can be carried out in a spectral domain, sequentially, by frequency band samples.

It can also be carried out in a time domain.

Figure 2:
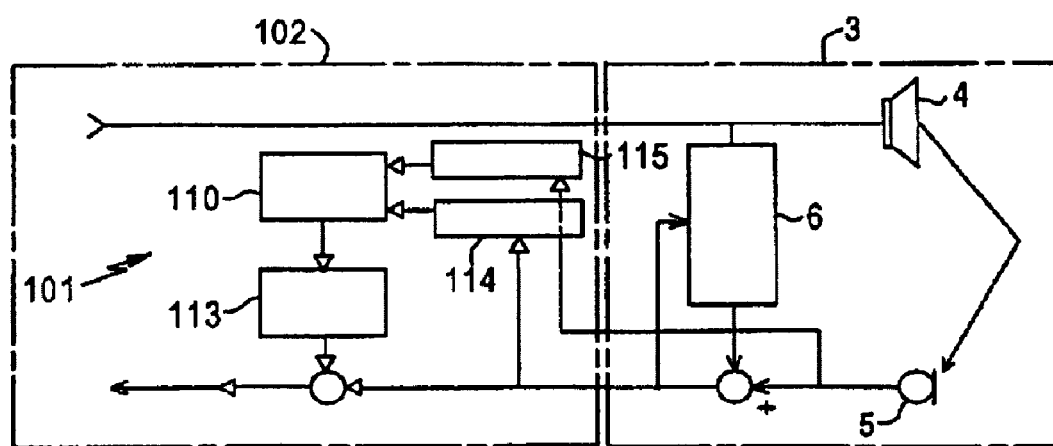
Figure 3:
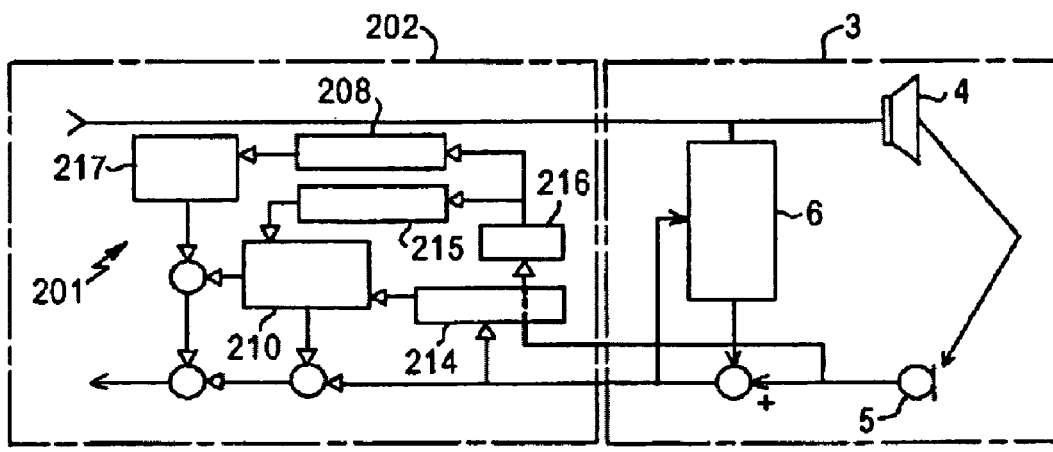

The features of the invention mentioned above, as well as others, will emerge more clearly from a reading of the following description of an example embodiment, the said description being given in relation to the accompanying drawings, amongst which:

FIG. 1 is a block diagram showing the functioning of an echo processing device according to a first embodiment of the present invention, FIG. 2 is a block diagram showing the functioning of an echo processing device according to a second embodiment of the present invention, and FIG. 3 is a block diagram showing the functioning of an echo processing device according to a third embodiment of the present invention.

With reference to FIG. 1, a first embodiment of the present invention will now be described.

An echo processing device 1 acts at a terminal of a communication system comprising a microphone 5 and a loudspeaker 4. The loudspeaker 4 receives a signal corresponding to the voice activity of a distant user and the microphone 5 emits a signal comprising a useful part due to the activity of a local user, a background noise part, and an echo part due to coupling between microphone and loudspeaker.

Overall, the echo processing device 1 comprises an adaptive echo cancellation device 3 and a residual echo processing device 2.

The adaptive echo cancellation device 3 acts between the input of the loudspeaker 4 and the output of the microphone 5. It comprises a finite pulse response filter 6. This filter is adapted to calculate, from the signal received by the loudspeaker, an estimation of an echo part of the signal emitted by the microphone. This estimation is subtracted from the signal emitted by the microphone.

The residual echo processing device 2 acts at the output of the adaptive echo cancellation device 3, that is to say the output signal processed by the adaptive echo cancellation device 3 is transmitted as an input to this residual echo processing device 2.

Overall, the residual echo processing device comprises a spectral transformation means 7 at the input and an inverse spectral transformation means at the output 11, between which there acts a spectral gain modifying means 12, controlled by a spectral gain calculation means 10 connected to an echo parameter calculation means 9 and a noise parameter calculation means 8.

The spectral transformation means 7 is adapted to decompose the output signal from the echo cancellation device 3 into N frequency band samples. The transformation is carried out using a fast Fourier transformation (FFT) algorithm. For applications where the sampling frequency of the signals is established at 8 kHz, it is possible to use for example a fast Fourier transformation algorithm on 256 frequency points, only 129 of which are used for the subsequent gain modification calculation.

The inverse spectral transformation means 11 is adapted to resynthesise the signal in the time domain. For example, it may use an operation of straddling between successive frames, which requires synthesis procedures of the WOLA (Weighted Overlap-Add) or WOSA (Weighted Overlap-Save) type.

The spectral gain modification means 12 is adapted to modify the spectral gains individually. It is controlled by the spectral gain calculation means which, from information available on each spectral component, determines a spectral attenuation for the spectral component in question.

For each spectral component, a calculation of the initial spectral attenuation is carried out using the known procedure mentioned above requiring here knowledge of the spectral distributions of the energies of the signal coming from the echo cancellation device, of the background noise signal, of the estimated echo signal, of the microphone signal and of the loud-speaker signal. The echo parameter calculation means makes it possible to determine whether or not the spectral component analysed corresponds to the echo alone. If such is the case, this component will be attenuated. Where it also corresponds to a useful part of the signal, that is to say corresponding to the voice activity of the local partner, it will not be attenuated, or only a little.

According to the invention, this initial spectral attenuation is corrected by means of a supplementary procedure forming a compensation means. For each spectral component, this procedure verifies whether or not the energy of the corresponding output signal as modified by the initial spectral attenuation is less than the energy of the corresponding spectral component of the background noise. If such is the case, the procedure replaces the initially calculated gain with an actual gain equal to the square root of the energy of the noise divided by the energy of the corresponding spectral component of the output signal. Thus this spectral component of the output signal will be taken to the level of the corresponding spectral component of the background noise. Where the energy of the output signal is greater than or equal to the energy of the background noise, the effective gain will be the initially calculated gain. The background noise parameter calculation means enables the energy of the background noise spectral component to be identified. The processing requires the implementation of a voice activity detection procedure in order to determine the moments when the spectral power density of the noise must be estimated. This detection procedure can be implemented at a frame rate over all the bandwidth of the signal, or, more finely, on each of the spectral components.

The procedures which have just been described can be executed by the following algorithm:

for (freq=0, $\Delta F$, ..., $N\Delta F$)
$G_{TX}$(freq, pT)=gain_calculation_procedure (Energy_sig_in, Energy_local_noise, Energy_echo, Energy_micro, Energy_LS)
if [$G_{TX}$(freq, pT)$^2$×Energy_sig_in(freq, pT)<Energy_local_noise (freq, PT)]

$$G_{\mathit{Effective}}(\mathit{freq}, pT) = \sqrt{\frac{\mathrm{Energy\_local\_noise}(\mathit{freq}, pT)}{\mathrm{Energy\_sig\_in}(\mathit{freq}, pT)}}$$

else
$G_{\mathit{Effective}}$(freq, pT)=$G_{TX}$ (freq, pT)
end if
sig_out(freq, pT)=$G_{\mathit{Effective}}$ (freq, pT)×sig_in (freq, pT)
end for.

This procedure uses the properties of simultaneous masking and frequency masking of the human auditory apparatus. In double speech situations, the spectral components corresponding to the voice activity of the local user are not attenuated, or only a little, by the processing, which preserves the quality of the useful signal transmitted. The residual echo signal is subjectively masked because of the simultaneous masking property of the auditory apparatus. On the other hand, the spectral components which correspond to echo alone are attenuated by the processing until they are returned to the level of the corresponding components of the background noise. These components thus modified will be only partially perceived by the distant user, because of the properties of frequency masking by the useful signal corresponding to the voice activity of the local user.

With reference to FIG. 2, a second embodiment of the present invention will now be described.

The echo processing device 101 acts at a terminal in a communication system comprising a microphone 5 and a loudspeaker 4. As in the previous embodiment, it comprises overall an adaptive echo cancellation device 3 and a residual echo processing device 102.

The adaptive echo cancellation device 3 is identical to that which is described in the first embodiment and the residual echo processing device 102 also acts at its output.

Overall, the residual echo processing device 102 comprises a means of calculating the local noise energy 115, at the input of which there is transmitted the signal output from the microphone 5, and a means of calculating the energy of the residual signal 114 at the input of which the signal output from the echo cancellation device 3 is transmitted, these means 114 and 115 both being connected to a means of calculating the initial transmission gain 110, itself connected to a transmission gain calculation correction means 113 which in the end acts on the output signal of the echo cancellation device which it is adapted to attenuate.

The initial transmission gain calculation means 110 is adapted to determine an initial gain variation law. Since the processing does not, unlike the previous embodiment, take place in a transformed domain, the initial gain variation law varies only as a function of time. This initial transmission gain calculation means 110 distinguishes the useful parts of the output signal of the echo parts and determines a gain variation law suitable for attenuating these. There is once again used for this the known procedure mentioned above requiring knowledge of the energies of the signal coming from the echo cancellation device, from the background noise signal, from the estimated echo signal, from the microphone signal and from the loudspeaker signal.

According to the invention, this initial attenuation is corrected by means of a supplementary procedure forming a compensation means. This procedure compares the mean power of the signal present at the output of the echo cancellation device, given by the means of calculating the energy of the residual signal 114, with the mean power of the background noise evaluated during the moments of voice non-activity, given by the local noise energy calculation means 115. In practice, this procedure checks whether or not the mean power of the signal present at the output of the echo cancellation device as modified by the initial gain variation law is less than the mean power of the background noise evaluated during the moments of voice non-activity divided by a coefficient K. If such is the case, the procedure replaces the initially calculated gain with an actual gain equal to the square root of the mean power of the background noise evaluated during the moments of voice non-activity divided by the power of the output signal multiplied by the coefficient K. Thus this spectral component of the output signal will be taken to the level of the corresponding spectral component of the background noise divided by the coefficient K. Where the mean power of the output signal as modified by the initial gain variation law is greater than or equal to the mean power of the background noise evaluated during the moments of voice non-activity, the actual gain will be the gain resulting from the application of the initial gain variation law. The parameter K makes it possible to control the residual noise level which will be transmitted to the distant user.

The procedures which have just been described can be executed by the following algorithm:

$G_{TX}(pT)$=gain_calculation_procedure (Energy_sig_in, Energy_local_noise,

Energy_echo, Energy_micro, Energy_LS)

if $[G_{TX}(pT)^2 \times$Energy_sig_in$(pT)<$Energy_local_noise$(PT)/K]$ $$G_{\textit{Effective}}(pT) = \sqrt{\frac{\text{Energy\_local\_noise}(pT)}{K \cdot \text{Energy\_sig\_in}(pT)}}$$

else $G_{\textit{Effective}}(pT)=G_{TX}(pT)$ end if sig_out$(pT)=G_{\textit{Effective}}(pT)\times$sig_in $(pT)$ This procedure makes it possible to adapt, constantly over the course of time, the depth of the variation in gain with respect to the characteristics of the residual echo signal. When the latter is highly energetic and therefore audible, this procedure aims to apply an attenuation so as to take this signal to the level of that of the noise measured in the local room corrected by the coefficient K. There are therefore no marked contrasts in the background noise but a continuous adaptation of the variation in gain to the acoustic environment of the local user. By taking account of the psycho-acoustic properties of the human auditory apparatus, the residual echo signal is subjectively masked by the ambient noise. It is therefore not audible when listening to the output signal modified by the residual echo processing device.

With reference to FIG. 3, a third embodiment of the present invention will now be described.

The echo processing device 201 acts at a terminal in a communication system comprising a microphone 5 and a loudspeaker 4. As in the previous embodiments, it comprises overall an adaptive echo cancellation device 3 and a residual echo processing device 202.

The adaptive echo cancellation device 3 is identical to the one described in the first embodiment and the residual echo processing device 202 also acts at its output.

The residual echo processing device 202 comprises a local noise energy calculation means 215, at the input of which there is transmitted the signal output from the microphone 5 by means of a voice activity detection means 216, and a means of calculating the energy of the residual signal 214 at the input of which the signal output from the echo cancellation device 3 is transmitted, these means 214 and 215 both being connected to a transmission gain calculation means 210 which acts on the output signal of the echo cancellation device which it is adapted to attenuate. This residual echo processing device 202 also comprises a means of calculating the parameters of the background noise 208, at the input of which there is transmitted the signal output from the microphone 5 by means of the voice activity detection means 216, this means 208 being connected to a comfort noise generating means 217 adapted to emit a signal which, weighted by a value complementary to that of the gain calculated by the transmission gain calculation means, will be added to the output signal of the echo cancellation device as attenuated by the application of this gain.

The initial transmission gain calculation means 210 is adapted to determine, as in the previous embodiment, a gain variation law. This initial transmission gain calculation means 210 distinguishes the useful part of the output signal from the echo parts and determines a gain variation law able to attenuate these. The known procedure mentioned above is once again used for this, and requires knowledge of the energies of the signal coming from the echo cancellation device, from the background noise signal, from the estimated echo signal, from the microphone signal and from the loudspeaker signal.

According to the invention, this attenuation is partly compensated for by a procedure based on the emission of a comfort noise, the application of the said procedure forming a compensation means.

The voice activity detection means detects whether a sampling period is a period in which the users are inactive.

If such is the case, the noise parameter calculation means 208 calculates the fundamental parameters characterising the background noise surrounding the local user. For example, the characteristics of the noise can correspond to the coefficients of the linear prediction model (or to the equivalent representations such as the reflection coefficients, LAR or LSP) with which the energy of the residue of this prediction is associated. These parameters are generally established from knowledge of the noise samples and the required prediction order. The choice of the latter parameter makes it possible to more or less faithfully reproduce the spectral characteristics of the noise actually present in the local environment.

The comfort noise generating means 217 uses these parameters of the background noise in order to generate a signal simulating the background noise present in the local environment. The transmission gain calculation means 210 calculates not only a gain value $G_{TX}$ to be applied to the output signal of the echo cancellation device, but also a gain value $(1-G_{TX})$ applied to the simulation signal emitted by the comfort noise generating means. The signals coming from the echo cancellation device 3 and from the comfort noise generating means 217 thus modified by the transmission gain calculation means 210 are added to each other in order to obtain a processed output signal which will be transmitted to the distant user.

If the processed output signal is designated sig_out(pT), the output signal of the echo cancellation device sig_in(pT), the signal simulation comfort_noise(pT) and the calculated gain $G_{TX}(pT)$, this gives, at a given moment:

sig_out$(pT)=G_{TX}(pT).$sig_in$(pT)+[1-G_{TX}(pT)].$comfort_noise$(pT)$

The comfort noise is therefore inserted only in the periods of attenuation of the signal aimed at reducing the audible residual noise. Outside these periods, when the gain is substantially equal to 1, the output signal contains the natural background noise in its entirety. In these periods, the sum of the comfort noise level and of the natural background noise level remaining after attenuation corresponds to the natural background noise level without attenuation. The distant user therefore does not perceive any noise contrast. In addition the natural background noise is kept to the maximum extent. It is also possible, in this embodiment, to allow large variations in gain, with a gain which may range from a value substantially equal to 1 to a value substantially equal to 0. The swing between these two states takes place in a very flexible manner, without generating contrast, with continuous continuity in the characteristics of the signal transmitted to the distant user.

The calculation procedures used by the three devices which have just been described can be implemented by processors existing at the present time, in particular by floating arithmetic real-time signal processors (DSPs), for example the TMS320C3X and TMS320C4X processors from Texas Instruments, or the AD21061 processor from Analog Devices.

With regard to the estimation of the energy of a signal used by the three devices which have just been described, this estimation can be carried out using a first-order infinite pulse response digital filtering according to the equation:

$$\text{Signal\_energy\_}X(pT)=\alpha.\text{Signal\_energy\_}X[(p-1)T]+(1-\alpha).X^N(pT).$$

Signal_energy_X represents the energy of the signal which it is sought to obtain. X represents the level of the sampled signal. N is an integer equal to 1 in the case of an amplitude estimation and equal to 2 in the case of an energy estimation. The value of the parameter α determines the time constant of the filter, this constant if necessary being able to be adapted in the course of time vis-à-vis the characteristics of the signals to be processed.

It is also possible to use two different time constants, one, the shorter, for the rise time and the other, longer, for the fall time. The estimation then takes place according to the equation:

$$\text{Signal\_energy\_}X(pT)=\alpha_r\text{Signal\_energy\_}X[(p-1)T]+(1-\alpha_r).X^N(pT),$$

for signal_energy_$X[(p-1)T] \geq .X^N(pT)$ $$\text{Signal\_energy\_}X(pT)=\alpha_f\text{Signal\_energy\_}X[(p-1)T]+(1-\alpha_f).X^N(pT),$$

for signal_energy_$X[(p-1)T] < .X^N(pT)$

Finally, it is possible to make an estimation with monitoring of peaks in accordance with the following procedure:

| | |
|---|---|
| if | $X^N(pT)$ > Signal energy_X[(p-1)T] |
| then | Signal_energy_X(pT) = $X^N$(pT), |
| otherwise | Signal_energy_X(pT) = α. Signal_energy_X[(p-1)T] + (1-α) . $X^N$(pT). |

With regard to the calculation of the initial gains used by the three devices which have just been described, this calculation can, as indicated above, be carried out in accordance with the known procedure described in particular in the patent document FR-A-2 748 184, where the transmission gain variation law is established according to the levels measured at the loudspeaker and the recording microphone. Other known procedures for calculating the gain variation law can also be applied.

For uncontrolled environments in which the acoustic characteristics are liable to change constantly over time, for example in the case of multiple users, in the case of users moving about, or background noises which are difficult to model, it is preferable to use the first embodiment described. This is because processing in the spectral domain best makes it possible to avoid the many problems mentioned above.

For better controlled environments in which the ambient noise can easily be modelled, use will advantageously be made of the device corresponding to the second embodiment of the present invention, this device making it possible to mask the echo residue with the ambient noise.

However, in some types of acoustic environment, for example a room in which many persons not taking part in the conversation are discussing and moving about, this second type of device cannot overcome all the noise contrast problems. The third embodiment of the present invention will then advantageously be used.

As a general rule, it will be advantageous to install the echo cancellation device and the residual echo processing device on the same signal processor. It will therefore be necessary for these two devices to function in the same domain. In other words, for an echo cancellation frequency processing using algorithms such as MDF and GMDF, it is desirable for the echo cancellation device to be supplemented by a residual echo processing device according to the first embodiment of the present invention. On the other hand, for an echo cancellation algorithm working in the time domain, such as LMS and NLMS, it is desirable for the echo cancellation device to be supplemented by a residual echo processing device according to the second embodiment or the third embodiment of the present invention.

The three devices described are aimed at modifying the residual echo signal so that the latter is inaudible within the signal transmitted to the distant user, because of the simultaneous masking properties, relating to time and frequency, inherent in the human auditory system.

These devices do not have excessive complexity and in particular they do not consume an excessive quantity of calculation time.

Although conceived originally for processing the acoustic echo in "hands-free" communication devices at a terminal, these devices could be adapted to deal with these same echo problems within a telecommunication network itself, for example at the switches or transcoders, or even for dealing with the electrical echo problems caused by hybrid connections.

What is claimed is:

1. A terminal for processing an echo, the terminal being part of a communication system, the terminal comprising:
    a first transducer for receiving a signal, the signal including a part due to activity of a distant user;
    a second transducer for emitting a second signal, the second signal including (a) a useful part due to activity of a local user, (b) a background noise part, and (c) an echo part due to coupling between said first and second transducers;
    an adaptive echo cancellation device adapted to (a) calculate, from the first signal received by said first transducer, an estimate of the echo part of the second signal emitted by said second transducer, and (b) subtract the estimate of the second signal emitted by said second transducer to produce an output signal from the echo cancellation device;
    a device for processing the residual echo at the output of said adaptive echo cancellation device, said residual echo processing device comprising:
        a gain controller for modifying said output signal of the echo cancellation device, said gain controller including a first analyzer for distinguishing components which make up said echo part;
        a second analyzer for identifying components which constitute said background part; and
        a calculator for determining a gain variation law, so as to reduce to the maximum possible extent the levels of said components making up said echo part without substantially affecting said useful parts; and
        a compensator for compensating for the effects of gain variation law on said components making up said background noise part, said compensator being arranged for (a) applying a modified gain such that the output signal is at the level of said component making up said background noise if the level of the output signal as it should be after application of said gain variation law is less than the level of a corresponding component making up said background noise part determined by said second analyzer, and (b) keeping the gain as determined by said variation law if the level of the output signal as it should be after application of said gain variation law is not less than the level of a corresponding component making un said background noise part determined by said second analyzer.

2. The terminal according to claim 1, wherein said compensator is arranged for (a) determining the mean energy of the output signal as it should be after application of said gain variation law to the mean energy of the background noise part evaluated during moments when the signals exchanged in said communication system have no useful part and (b) modifying the gain variation law so that the output signal modified by said gain control means is at the level of said background noise part in response to the determined said mean energy of the signal being less than said mean energy of the background noise part.

3. The terminal according to claim 2, wherein said mean energy of the background noise part is arranged to be corrected by a coefficient for controlling the residual transmitted noise level.

4. The terminal according to claim 1, wherein the compensator comprises a simulation signal generator for reproducing the characteristics of said background noise part in response to said output signal being modified by said gain controller.

5. The terminal according to claim 4, wherein the simulation signal, weighted by a factor, is added to said output signal modified by the gain determined by said variation law, the sum of said weighting factor and of said gain being equal to 1.

6. The terminal according to claim 5, further comprising a detector for detecting the activity of the user tar adjusting the simulation signal generator when the users are inactive.

7. The method terminal according to claim 4, further comprising a detector for the activity of the user for adjusting the simulation signal generator when the users are inactive.

8. The terminal according to claim 1, further comprising a first converter for passing from time processing domain to a spectral processing domain and a second converter for passing back to the time processing domain again the first and second converters being on opposite sides of the gain controller, the parts of the first and second signals farming the echo part or the background noise part taking the form of spectral components of said output signal.

9. The terminal according to claim 8, wherein the special components of the output signal are analyzed sequentially by frequency band samples, said first analyzer being arranged far distinguishing each component making up said echo part, said second analyzer being arranged for identifying a spectral component making up said background noise part, said calculator being arranged for determining a gain peculiar to a given spectral component far reducing its level to the maximum extent if the spectral component forms said echo part, and said compensator being arranged for (a) modifying said gain so that said given spectral component is at the level of said corresponding background noise spectral component if the energy of the output signal as it should be after modification by the said gain, for said given spectral component, is less than the energy of the corresponding spectral component making up said background noise part, and (b) keeping the gain as determined by said variation law if the energy of the output signal as it should be after modification by the said gain, for said given spectral component, is not less than the energy of the corresponding spectral component making up said background noise part.

10. An echo processing method in a communication system at a terminal having a first transducer receiving a first signal including a part due to activity of a distant user and a second transducer emitting a second signal including a useful part due to activity of a local user, a background noise part, and an echo part due to coupling between said transducers, said method comprising:

a first adaptive echo cancellation step including (a) calculating, from the first signal received by said first transducer, an estimate of said echo part of the second signal emitted by said second transducer, and (b) subtracting said estimate of said second signal emitted by said second transducer in order to produce an output signal;

a second step of processing the echo remaining after said echo cancellation step, said second step including (a) distinguishing components which make up said echo part, (b) identifying components which make up said background noise part, and (c) determining a gain variation law modifying said output signal so as to reduce to the maximum extent the levels of said elements making up said echo part without substantially affecting said useful part; and compensating for the effects of said gain variation law on said components making up said background noise part by (a) modifying the gain determined by said variation law so that the output signal modified is at the level of said component making up said background noise part if the level of the output signal as it should be after application of said gain variation law is less than the level of a corresponding component making up said determined background noise part, and (b) keeping the gain as determined by the gain variation law if the level of the output signal as it should be after application of said gain variation law is not less than the level of a corresponding component making up said determined background noise part.

11. The method according to claim 10, wherein the processing step of said second echo processing step is carried out in a spectral domain, sequentially, by frequency band samples.

12. The method according to claim 11, wherein said second echo processing step is carried out in a time domain.

13. A terminal for processing an echo, the terminal being part of a communication system, the terminal comprising a first transducer for receiving a signal, the signal including a part due to activity of a distant user and a second transducer for emitting a second signal, the second signal including (a) a useful part due to the activity of a local user, (b) a background noise part and (c) an echo part due to coupling between the transducers, an adaptive echo cancellation device being adapted to (a) calculate, from the first signal received by said first transducer, an estimate of the echo part of the second signal emitted by said second transducer and (b) subtract the estimate of the second signal emitted by said second transducer to produce an output signal from the echo cancellation device, a device for processing the residual echo at the output of said adaptive echo cancellation device, the said residual echo processing device comprising a gain controller for modifying said output signal of the echo cancellation device, said gain controller including a first analyzer tar distinguishing components which make up said echo part, a second analyzer for identifying components which constitute said background part, and a calculator for determining a gain variation law, so as to reduce to the maximum possible extent the levels of said components making up said echo part without substantially affecting said useful parts, a compensator for compensating for the effects of said gain variation law on said components making up said background noise part, said compensator being arranged for (a) comparing the level of the output signal as it should be after application of said gain variation law at the level of a corresponding component making up said background noise part determined by the said second analyzer and (b) modifying the gain determined by said variation law so that the output signal modified by said gain controller is at the level of said component making up said background noise part in response to the determined level of said output signal being less than said level of said component;

wherein the compensator comprises a simulation signal generator for reproducing the characteristics of said background noise part in response to said output signal being modified by said gain controller.

14. The terminal according to claim 13, wherein the simulation signal, weighted by a factor, is added to said output signal modified by the gain determined by said variation law, the sum of said weighting factor and of said gain being equal to 1.

15. The terminal according to claim 14, further comprising a detector for detecting the activity of the user for adjusting the simulation signal generator when the users are inactive.

16. The method terminal according to claim 13, further comprising a detector for the activity of the user for adjusting the simulation signal generator when the users are inactive.

17. Echo processing method in a communication system at a terminal having a first transducer receiving a first signal including a pert due to the activity of a distant user and a second transducer emitting a second signal including a useful part due to the activity of a local user, a background noise part, as well as an echo part due to coupling between said transducers, said method comprising:

a first adaptive echo cancellation step including (a) calculating, from the first signal received by said first transducer, an estimate of said echo part of the second signal emitted by said second transducer, and (b) subtracting said estimate of said second signal emitted by said second transducer in order to produce an output signal, a second step of processing the echo remaining after said echo cancellation step, said second step including (a) distinguishing components which make up said echo part, (b) identifying components which make up said background noise part, and (c) determining a gain variation law modifying said output signal so as to reduce to the maximum extent the levels of said elements making up said echo part without substantially altering said useful part, and compensating for the effects of said gain variation law on said components making up said background noise part by (a) comparing the level of the output signal as it should be after application of said gain variation law with the level of a corresponding component making up said determined background noise part, and (b) modifying the gain determined by said variation law so that the output signal modified is at the level of said component making up said background noise part in response to the comparison indicating said level of said output signal is less than said level of said component, the compensating step including simulating reproduction of the characteristics of said background noise part in response to said output signal being modified by said gain controller.

18. The method according to claim 17, wherein the processing step of said second echo processing step is carried out in a spectral domain, sequentially, by frequency band samples.

19. The method according to claim 18, wherein said second echo processing step is carried out in a time domain.

* * * * *